(12) United States Patent
Labenski et al.

(10) Patent No.: US 9,501,562 B2
(45) Date of Patent: Nov. 22, 2016

(54) IDENTIFICATION OF COMPLEMENTARY DATA OBJECTS

(71) Applicant: International Business Machines Corporation, Armonk, NY (US)

(72) Inventors: Marcin Labenski, Cracow (PL); Hari H. Madduri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 13/779,593

(22) Filed: Feb. 27, 2013

(65) Prior Publication Data

US 2013/0226922 A1 Aug. 29, 2013

(30) Foreign Application Priority Data

Feb. 28, 2012 (EP) .................................. 12157304

(51) Int. Cl.
  *G06F 17/30* (2006.01)
  *G06K 9/62* (2006.01)
(52) U.S. Cl.
  CPC ......... *G06F 17/30705* (2013.01); *G06K 9/622* (2013.01)
(58) Field of Classification Search
  USPC .................................................. 707/737, 736
  See application file for complete search history.

(56) References Cited

U.S. PATENT DOCUMENTS

| | | | |
|---|---|---|---|
| 6,226,408 B1 * | 5/2001 | Sirosh ........................... | 382/224 |
| 6,360,212 B1 * | 3/2002 | Linzenkirchner et al. ....... | 706/4 |
| 6,397,166 B1 * | 5/2002 | Leung et al. ................. | 702/179 |
| 6,587,576 B1 * | 7/2003 | Wesolkowski ............... | 382/112 |
| 7,028,301 B2 | 4/2006 | Ding et al. | |
| 7,464,147 B1 | 12/2008 | Fakhouri et al. | |
| 8,484,215 B2 | 7/2013 | Anderson | |
| 2006/0069786 A1 | 3/2006 | Mogul et al. | |
| 2007/0083513 A1 * | 4/2007 | Cohen et al. ..................... | 707/6 |
| 2008/0313135 A1 * | 12/2008 | Alexe et al. ...................... | 707/2 |
| 2009/0105987 A1 * | 4/2009 | Song et al. .................. | 702/181 |

(Continued)

FOREIGN PATENT DOCUMENTS

| | | |
|---|---|---|
| CN | 102197406 A | 9/2011 |
| WO | 2011011317 A2 | 10/2010 |

OTHER PUBLICATIONS

K. Ren et al, "Otus: Resource Attribution in Data-Intensive Clusters", dated Jun. 8, 2011, pp. 1-8, AMC, San Jose CA.

(Continued)

*Primary Examiner* — James Trujillo
*Assistant Examiner* — Aida Tessema
(74) *Attorney, Agent, or Firm* — William K. Konrad; Konrad, Raynes, Davda and Victor LLP

(57) ABSTRACT

In one aspect, the description relates to identifying complementary data objects, including providing a plurality of data objects, applying a clustering algorithm for grouping at least some of the data objects into two or more clusters, for each of the clusters, calculating a cluster center, calculating, for at least a first one of the cluster centers, a complementary cluster center, determining a second cluster center of a second cluster, the second cluster center being determined as the one of the cluster centers having the smallest distance in respect to the complementary cluster center, selecting at least one data object of the determined second cluster. Other features and aspects may be realized, depending upon the particular application.

22 Claims, 3 Drawing Sheets

(56) References Cited

U.S. PATENT DOCUMENTS

| | | | |
|---|---|---|---|
| 2009/0287744 A1* | 11/2009 | Bernardini et al. | 707/202 |
| 2010/0106724 A1* | 4/2010 | Anderson | 707/737 |
| 2010/0114970 A1* | 5/2010 | Marin | 707/802 |
| 2010/0217763 A1* | 8/2010 | Park et al. | 707/737 |
| 2011/0055373 A1 | 3/2011 | Bnayahu et al. | |
| 2012/0023218 A1* | 1/2012 | Journeau et al. | 709/223 |
| 2012/0303618 A1* | 11/2012 | Dutta et al. | 707/737 |
| 2013/0138688 A1 | 5/2013 | Anderson | |

OTHER PUBLICATIONS

Information Materials for IDS, dated Jan. 21, 2016, Total 6 pages.
Machine Translation for CN102197406A, published Sep. 21, 2011, Total 48 pages.
Patent 8484215 is an English counterpart to CN102197406A.
Publication 2010106724 is an English counterpart to CN102197406A.
Publication 2013138688 is an English counterpart to CN102197406A.

* cited by examiner

IDENTIFICATION OF COMPLEMENTARY DATA OBJECTS

RELATED APPLICATION

This application claims priority benefits under Title 35, United States Code, Section 119(a)-(d) from European application EP12157304, filed Feb. 28, 2012, entitled "Identification of Complementary Data Objects", assigned to the assignee of the present application, and incorporated by reference in its entirety.

TECHNICAL FIELD

The description relates to the field of data processing, and more particularly to the field of clustering data objects.

BACKGROUND

The problem of quickly determining the similarity and dissimilarity of data objects is a widespread problem in the fields of data processing and data mining and is of relevance for a plurality of technical appliances.

Depending on the respective use case scenario, the combined processing of highly similar data objects or, alternatively, the combined processing of highly dissimilar data objects may be favorable. However, in particular for huge collections of data objects respectively comprising a plurality of 'attribute values' or 'property values' which need to be considered, approaches known in the art for determining the similarity or dissimilarity of data objects consume a considerable amount of time and processing power, as typically said approaches are based on an all-against-all comparison of data objects, whereby a plurality of property values have to be compared with each other respectively. In the realm of cloud computing, a common problem is that Virtual Machines or other program instances sharing the same set of hardware resources may only make poor usage of said resources if their requirements in terms of processing power or memory are too similar, as e.g. the consumed processing power may soon reach the resources' capacity limit while there may be plenty of unused memory. Executing an all-against-all comparison of the properties of potentially thousands of large cloud computing environments to determine similar and dissimilar Virtual Machines is, however, often not practically feasible due to the complexity and required processing time of such a comparison.

SUMMARY

The present description is directed to a computer implemented method, computer program product and computer system for determining complementary data objects, features of which are identified in the claims including the independent claims. Also, other embodiments of the description are given in the dependent claims. If not explicitly stated otherwise, embodiments of the description can be combined freely with each other.

The term 'data object' as used herein is a broad term and is used in its ordinary sense to include, without limitation, any distinct or identifiable grouping of electronic information that exists in storage and/or on which operations can be performed, e.g. the data content of a single memory block, a file, or any other collection of electronic information. In one embodiment, a data object is smaller (e.g. <100 Kilobyte) and includes a plurality of property-value pairs. According to some embodiments, a 'data object' represents a physical object, e.g. a car, a machine, a human or an animal, and the property value pairs of the data object may represent properties of said physical object. According to other embodiments, a data object represents a piece of data, wherein a piece of data is any data object within the meaning of the above definition which may itself be too big to be used as an input for a clustering algorithm and which is thus represented by data objects only comprising or being descriptive of some of the properties of said piece of data, e.g. its size. For example, the piece of data can be a data file, an executable program, a virtual machine.

A 'GUI element' is a displayable element of a graphical user interface (GUI), whereby some of GUI element's attributes specify the shape, layout and/or behavior of an area on said GUI displaying the GUI element. A GUI element can be a standard GUI element such as a button, a text box, a tab, an icon, a text field, a pane, a check-box item or item group or the like. A GUI element can likewise be an image, an alphanumeric character or any combination thereof.

A 'cloud' or 'cloud computing environment' as used herein is a data processing environment in which computing hardware can be dynamically reapportioned to one or more processing tasks. In many current cloud computing environments, a plurality of virtual machines is provided making use of a plurality of physical hardware resources, e.g. processors, main memory and non-transitory computer readable storage media. For example, a pool of physical machines maintained by an organization may be the basis for running a plurality of virtual machines (VMs). The organization's applications running on said VMs will thus not run directly on the underlying physical resources, but rather on an additional layer of abstraction, a VM. By using virtual machines rather than physical machines directly, the reliability and performance of the services provided by said organization may be improved and the required hardware resources may be dynamically provisioned in accordance with the actual workload.

The expression 'entity and its complementary entity' as used herein relates to any entity which in combination with its complementary entity constitutes a complete whole. Thus, the complementary entity supplies parameter values or other features its respective reference entity lacks. Thereby, an entity may be a data value, a data object, a multitude of data values, a group of data objects or any other item comprising or having assigned one or more property value pairs. The complete whole may be any parameter value or combination of parameter values being e.g. the one or more minimum possible parameter values or maximum possible parameter values obtainable in a given use case scenario or implementation. Depending on the embodiment, said total whole may be automatically determined dynamically or may be predefined. Thus a 'degree of complementarity' is any value or set of values being indicative of a degree of two objects complementing each other in respect to a data set representing a 'total whole'. Said data space may be given, for example, by all property-value pairs of a plurality of received data objects, may be a predefined data space, a data space representing one or more maximum available resource capacities, e.g. the maximum available CPU power, memory or storage space or the like.

A 'resource' or 'hardware resource' as used herein is any hardware entity such as, for example, a processor, storage disk, main memory, an adapter, database, network card and the like that individually or collectively provides some functionality or services to a user. Such a service can be, for example, the provision of an application program, of storage space, of a runtime environment for executing code, a remote service, e.g. a web service, or the like.

A 'cluster' as used herein is a group of one or more data objects, whereby the assignment of the data objects to the respective group is the result of applying a clustering algorithm on all the data objects.

A 'clustering algorithm' as used herein encompasses any computer-implemented, automated grouping of data objects into groups of data objects herein also referred as 'clusters' by taking one or more property value pairs of the respective data object as input. During the clustering, the similarity of data objects is determined and similar data objects (in respect to one or more criteria) are grouped into the same cluster. According to some embodiments, the clustering of data objects may also comprise the classification of data objects, whereby classifying data objects implies grouping the data objects into a predefined number of clusters (i.e., 'classes'). According to preferred embodiments, the number of clusters is determined dynamically depending on the property value pairs of the clustered data objects.

A 'vector' as used herein encompasses any data structure consisting of a sequence of elements respectively adapted to store a property value, wherein each element at a given position in said vector represents a particular property. A vector as understood herein encompasses data structures whose capacity can expand dynamically when needed and also encompasses data structures with a fixed capacity (also known as 'arrays'). A 'cluster center' of a cluster as used herein encompasses any data value or set of data values having been derived from one or more property values of all data objects belonging to said cluster.

The expression 'resource consumption' encompasses the permanent or temporary usage of some storage, processing or other capacities provided by a hardware resource, whereby said usage is caused by storing or executing a piece of data on said hardware resource.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon. Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

In one aspect, the description relates to a computer implemented method for identifying complementary data objects. A plurality of data objects are provided, whereby each of the data objects comprise or have assigned a plurality of property-value pairs. Then, a clustering algorithm is applied on all the data objects for grouping at least some of the data objects into two or more clusters. Thereby, the grouping depends on the property-value pairs of the data objects. For each of the clusters, a cluster center is calculated, whereby said cluster center comprises a plurality of derivative property-value pairs having been derived from the property-value pairs of all data objects belonging to said cluster. Then, for at least a first one of the cluster centers, a complementary cluster center is calculated. The first cluster center is a cluster center of a first one of the clusters. The complementarity cluster center has a maximum possible degree of complementarity in respect to the first cluster center within the boundaries of a given data space. A second cluster center is determined, the second cluster center being a cluster center of a second cluster. The second cluster center is determined as the one of the cluster centers having the smallest distance in respect to the complementary cluster center. Then, at least one data object of the determined second cluster is selected as a data object being complementary to the data objects of the first cluster. For example, a set of hardware resources may provide for a maximum possible CPU power, a maximum usable storage space and/or a maximum usable memory. Said maximum possible resource usage parameter values may represent a data space within which complementary data objects may complement each other, i.e., within which combined property values of different, complementary data objects approximately reach the boundaries of said data space. For example, a first cluster representing e.g. Virtual Machines having particular usage consumption characteristics may be complementary to a cluster center representing complementary resource usage consumption parameter values within the boundaries given by the available hardware resources.

Said features may be advantageous, because a very fast way of identifying complementarity data objects is provided which is not based on an all-against-all comparison of data objects. Rather, at first clusters of data objects and respective cluster centers are determined. The determination of complementarity data objects for any particular cluster requires only a very limited set of processing steps. It is not even necessary to calculate a pairwise distance for all the obtained cluster centers. Rather, it is possible to determine for any selected cluster and data objects contained therein, in very few straightforward steps one or more complementarity data objects by calculating a complementary cluster center and determining the nearest cluster center and corresponding cluster as the second cluster center and second cluster as described.

According to further embodiments, each of the data objects represents a piece of data. Depending on the embodiment, a piece of data may be a non-executable set of data, e.g. a non-executable file, a compressed file archive, or the like. Said piece of data may likewise be a virtual machine, an application program, disc images or executable program scripts. The property-value pairs of each of the data objects may represent any kind of feature being either predefined or resulting from storing or executing said pieces of data on a hardware resource and monitoring some corresponding resource consumption parameters. A predefined property value pair of a data object may be indicative of a feature which is intrinsic to a piece of data or is intrinsic to the data object representing said pieces of data. A predefined property value may be any value assigned a data object property without monitoring the storing or execution of a piece of data represented by said data object on one or more resources. An predefined property may be, for example, a type of class the data object representing the piece of data belongs to; the file type or data type of the piece of data; a customer said piece of data belongs to; a size of said piece of data; the type of a Virtual Machine in case the pieces of data respectively are VMs; a priority number being indicative of a priority of transferring the piece of data represented by a data object to a resource. Preferentially, a predefined property value pair does not change over the life time of its assigned data object. At least some of the property-value pairs of each of the data objects are resource consumption property-value pairs, wherein the resource consumption properties may be selected, in any combination, from a group comprising: an average CPU utilization; a maximum CPU utilization; an average disc space utilization; a maximum disc space utilization; an average memory utilization; a maximum memory utilization; an average disc I/O utilization; a maximum disc I/O utilization; an average network I/O utilization; and a maximum network disc I/O utilization.

According to embodiments, wherein each of the data objects represents a piece of data being executed or stored on a hardware resource, and wherein one or more of the properties are resource consumption properties, the method further comprises: monitoring the values of one or more of the resource consumption properties of the piece of data being executed or stored on the resource during a period of time; said monitoring steps can be executed over a predefined period of time, e.g. some minutes, an hour, a day or a week. Then, for each of the monitored properties and for each of the data objects, calculating a maximum and/or an average resource consumption property value over said period of time; and assigning the calculated maximum and/or average resource consumption property values to the data object representing the monitored piece of data for using said assigned property values as input for the clustering algorithm. Said features may be advantageous, because by monitoring the resource consumption dynamically and assigning the monitored resource consumption in the form of property-value pairs to the data objects representing the monitored pieces of data, it is possible to apply the clustering on automatically obtained resource consumption data which may accurately represent the individual, typical resource consumption of a particular piece of data during a given time period.

According to embodiments, the monitoring of the property-value pairs is executed on a regular basis, e.g. once in a week or a month. Upon each repeat, the monitored property-value pairs are assigned to the respective the monitored data objects/pieces of data and the clustering algorithm is executed repeatedly in an automatic manner by taking the respectively collected monitoring data as input. The time interval between two repeats (preferentially weeks or month) is typically not identical to the time periods used for determining average values (e.g. bits per second, floating operations per second, etc.) for the respective resource consumption parameters. The automatically executed clustering algorithm selectively takes as input only the most currently monitored set of property-value pairs. Thus, the accuracy of the clustering of virtual machines in respect to their real—typically time-dependent—resource consumption may be increased. Using said embodiment for determining the virtual machines having complementarity resource usage characteristics may be advantageous in particular in a cloud processing environment as said feature allows to reduce the cost of providing and maintaining the hardware infrastructure as it is possible to pack more virtual machines per hardware resource. This is achieved by transferring complementarity virtual machines, i.e., virtual machines having complementarity workload characteristics, on to the same hardware resources. For example, a virtual machine having a high CPU load, a low disc usage and a low memory usage could be automatically determined to be complemented by another virtual machine causing a low CPU load but a high disc and a high memory usage. In a further advantageous aspect, determining complementarity virtual machines by evaluating monitored resource consumption property values having been averaged over a period of time may return more stable results than state-of-the-art virtual machine placement approaches taking into consideration only resource consumption data being obtained at a point in time. Thus, a better usage of available resources may be achieved.

According to some embodiments wherein each of the data objects represents a piece of data to be executed or stored on a hardware resource, the method further comprises: receiving, by a data placement engine, one or more further data objects, each of the further data objects representing a piece of data currently executed or stored on said hardware resource, each of the further data objects comprising a plurality of property-value pairs. One or more of said property-value pairs are indicative of a currently consumed capacity of said hardware resource by said executed or stored pieces of data; grouping said further data objects into one further cluster and calculating a further cluster center, said further cluster center being the cluster center of said further cluster; thereby, the further cluster center represents the further pieces of data currently being executed or stored on said hardware resource; using the further cluster center as the first cluster center for calculating the complementary cluster center and for determining the second cluster; and automatically transferring one or more pieces of data represented by data objects of said second cluster to said hardware resource or prompting a user to initiate said transfer.

According to embodiments, the execution of the clustering algorithm is triggered by an event such as, for example, the receipt of a request by the placement engine to transfer a particular number and type of additional pieces of data to the cloud. The placement engine may send a command to the clustering module triggering the execution of the clustering algorithm and the calculation of the cluster centers. The clustering module then returns the calculated clusters and cluster centers as result to the placement engine, thereby allowing the placement engine to select complementary pieces of data represented by complementary data objects and to transfer the complementary pieces of data to a common resource.

According to further embodiments the method further comprises: receiving, by a data placement engine, e.g. a VM placement engine, an indication of at least the first and second cluster; and automatically transferring pieces of data represented by data objects of the first and the second cluster to a hardware resource or prompting a user to initiate said transfer. Thus, the usage of a given hardware resource is optimized. Depending on the embodiment, the clustering algorithm may be one of: a k-Medoids clustering algorithm; a demographic clustering algorithm; a self-organizing maps clustering approach, in particular a Kohonen self-organizing maps based algorithm; a classification algorithm grouping the data objects into a predefined number of classes acting as clusters; and an overlapping clustering algorithm. A 'demographic clustering algorithm' as used herein encompasses any distribution-based clustering approach generating clusters characterized by the value distributions of their data objects. The similarity of each data object with each of the currently existing clusters is calculated. If the biggest calculated similarity is above a given threshold, the data object is added to the relevant cluster. This cluster's characteristics change accordingly. If the calculated similarity is not above the threshold, or if there is no cluster (which is initially the case) a new cluster is created that contains the data object alone. The maximum number of clusters as well as the similarity threshold may be specified by an operator. Demographic Clustering may use the statistical Condorcet criterion to manage the assignment of records to clusters and the creation of new clusters. The Condorcet criterion evaluates how homogeneous each discovered cluster is (in that the records it contains are similar) and how heterogeneous the discovered clusters are among each other. The iterative process of discovering clusters stops after two or more passes over the input data if the improvement of the clustering result according to the Condorcet criterion does not justify a new pass.

According to some embodiments, the calculation of the cluster centers comprises: for each of the data objects, representing all property-value pairs of said data object as an object vector, each element of said object vector corresponding to one of the properties and having stored said property's value; providing a center vector for each of the clusters, the center vector specifying the cluster center of said cluster, wherein the elements at a given position in the center vectors and elements in the object vectors having the same position represent the same one of the properties; for each of the clusters, calculating its respective cluster center by storing, into each element of the cluster's center vector, an arithmetic mean value, the arithmetic mean value being calculated from the values stored in the corresponding elements of the object vectors of said cluster. Here, the term 'corresponding' implies that each element of the center vector represents the same property as the elements having the same position in the object vectors. According to preferred embodiments, the number of property value pairs determines the vector size and the dimensionality of the clustering.

According to some embodiment the method further comprises a step of randomly selecting one or more data objects of the determined second cluster or prompting a user to execute said selection. Transferring of the one or more pieces of data comprises automatically transferring the one or more pieces of data represented by said selected data objects of said second cluster or prompting a user to initiate said transfer, e.g. via a GUI. Any combination data object selection (e.g. an automated, random selection or a user-defined selection of the data objects) and the data transfer (fully automated or upon a users' approval) is possible.

According to embodiments, all values stored in elements of the object vectors are normalized before the arithmetic mean values are calculated. All the normalized values are larger than or equal to 0 and are smaller than or equal to a predefined maximum value MaxV. The cluster centers of all clusters are calculated by using the normalized property-value pairs of the respective data objects of each respective cluster as input.

According to embodiments, the calculation of the complementary cluster center in respect to the first cluster comprises: calculating, for each element e of the center vector of the first cluster having stored a property value $PV_e$, a complementary value $CV_e$, wherein $CV_e = MaxV - PV_e$; storing each complementary value $CV_e$ to an element of a complementary center vector acting as the complementary cluster center; for each of the clusters, calculating an Euclidian distance between the center vector of said cluster and the complementary center vector; and using said Euclidian distances for determining the second cluster center as the one of the cluster centers having the smallest Euclidian distance in respect to the complementary cluster center. Applying a normalization step may prevent domination by a single property value pair. For instance, disc usage expressed in bytes with values between 0 and $1 \times 10^{15}$ could easily dominate CPU utilization expressed in percent. After having applied the normalization, every single property-value is between zero and MaxV.

According to embodiments, the method further comprises: displaying one or more selectable first GUI elements on a GUI for allowing a user to select N of the properties, wherein N is an integer larger than 1; displaying second and third GUI elements in an N-dimensional coordinate system on the GUI, each of the second GUI elements representing a cluster, each of the third GUI elements representing a data object, wherein the third GUI elements representing data objects of different clusters differ from each other, wherein each of the axes of the N-dimensional coordinate system represents one of the three selected properties, the three values of said selected properties of each of the data objects determining the corresponding axis' coordinate values of the third GUI element representing said data object. Said features are advantageous because they provide a user with a graphical representation of the clustering results that can quickly and easily be understood and can be used for evaluating which ones of the data objects are complementary to each other. In case the data objects represent virtual machines, said graphical representation presented to the user via a screen may allow the user to determine which of the virtual machines should be placed together on the same hardware resource of a resource pool of a cloud environment.

According to some embodiments, the method further comprises determining a subset of properties from the totality of property-value pairs. The subset of properties is determined by receiving a selection signal from a user or by automatically determining, by a data placement engine, bottleneck parameters of a hardware resource. A 'bottleneck parameter' as used herein may be any parameter being indicative of the average or maximum resource usage of a given piece of data A bottleneck parameter may be one of the resource usage parameters whose respective parameter values have the highest risk of reaching or exceeding the capacity of a given hardware resource. One or more bottleneck parameters may be selected by the user via a GUI or may be determined by the data placement engine automatically. The data placement engine may be operable to monitor the one or more hardware resources for determining the one or more resource consumption parameter values being the first ones to exceed the available capacity of the respective hardware resource. Said determined parameters may be used as the bottleneck parameters. Then, the steps of applying the clustering algorithm and calculating the cluster centers and the complementarity cluster center is executed by selectively taking the property-value pairs of those properties determined to be a bottleneck parameter as input. Said concentration on the bottleneck parameters may be advantageous as the speed of executing the clustering is increased and the clustering results are particularly suited for placing the pieces of data together on the same hardware resources in a way that bottlenecks are prohibited.

In a further aspect, the description relates to a computer-readable non-transitory storage medium comprising instructions which, when executed by a processor, execute the steps according to any one of the embodiments described above.

In a further aspect the description relates to a data processing system comprising a clustering computer system. The clustering computer system comprises a storage medium having stored a plurality of data objects and/or an interface for receiving the data objects via a network. Each of the data objects has a plurality of property-value pairs. The clustering computer system further comprises a processor being adapted for applying a clustering algorithm for grouping at least some of the data objects into two or more clusters. The grouping depends on the property-value pairs of the data objects. Further, the processor is adapted for calculating, for each of the clusters, a cluster center, the cluster center comprising a plurality of derivative property-value pairs derived from the property-value pairs of all data objects belonging to said cluster; for calculating, for at least a first one of the cluster centers, a complementary cluster center, the first cluster center being a cluster center of a first one of the clusters, the complementary cluster center having a maximum possible complementarity in respect to the first cluster center; for determining a second cluster center of a second cluster, the second cluster center being determined as the one of the cluster centers having the smallest distance in respect to the complementary cluster center; and for selecting at least one data object of the determined second cluster as a data object being complementary to the data objects of the first cluster.

According to embodiments, each of the data objects represents a piece of data being executed or stored on a hardware resource. One or more of the properties are resource consumption properties. The clustering computer system is operatively coupled to a monitoring module. The monitoring module is adapted for monitoring one or more of the values of the resource consumption properties of the piece of data being executed or stored on the resource during a period of time. The clustering computer system is adapted for executing the following steps: for each of the monitored properties and for each of the data objects, calculating a maximum and/or an average resource consumption property value over a period of time; and assigning the calculated maximum and/or average resource consumption property values to the data object representing the monitored piece of data for using said assigned property values as input for the clustering algorithm.

According to some embodiments, the data processing system further comprises a data placement engine. According to some embodiments, the data placement engine is adapted for:
  receiving one or more further data objects, each of the further data objects representing a piece of data currently executed or stored on said hardware resource, each of the further data objects comprising a plurality of property-value pairs wherein one or more of said property-value pairs are indicative of a currently consumed capacity of said hardware resource and/or are indicative of a predefined resource consumption, e.g. a storage size;
  using the received one or more further data objects for grouping said further data objects into one further cluster and for calculating a further cluster center, said further cluster center being the cluster center of said further cluster;
  using the further cluster center as the first cluster center for calculating the complementary cluster center and for determining the second cluster; and
  automatically transferring one or more pieces of data represented by data objects of said second cluster to said hardware resource or prompting a user to initiate said transfer.

According to some embodiments, the data placement engine is in addition or alternatively adapted for: receiving an indication of at least the first and second cluster; and for automatically transferring pieces of data represented by data objects of the first and the second cluster to a hardware resource or prompting a user to initiate said transfer.

Other features and aspects may be realized, depending upon the particular application.

BRIEF DESCRIPTION OF THE DRAWINGS

In the following, preferred embodiments of the description will be described in greater detail by way of example only making reference to the drawings in which.

DETAILED DESCRIPTION

Figure 1:
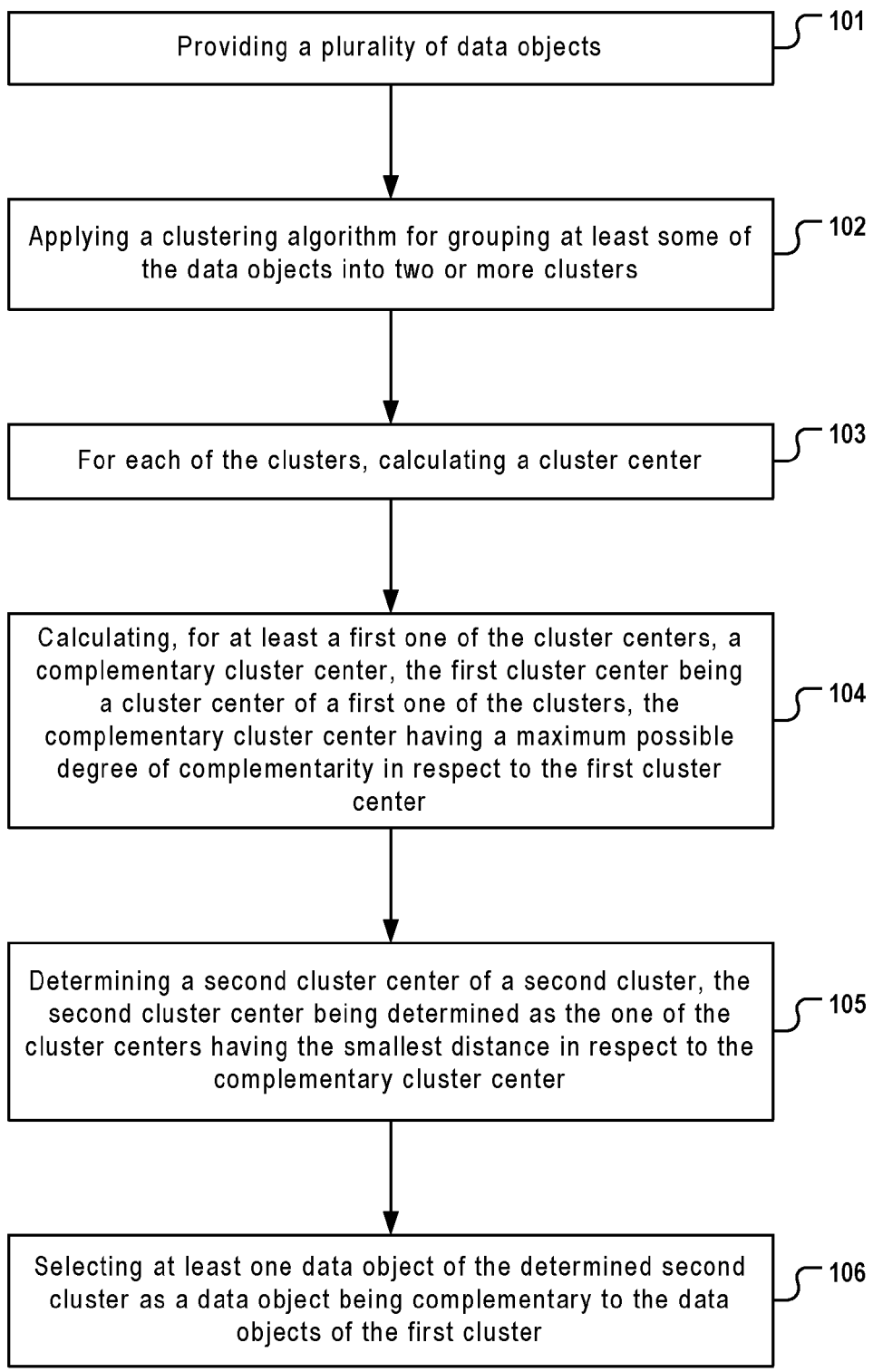
FIG. 1 is a flowchart of a method.
Figure 2:
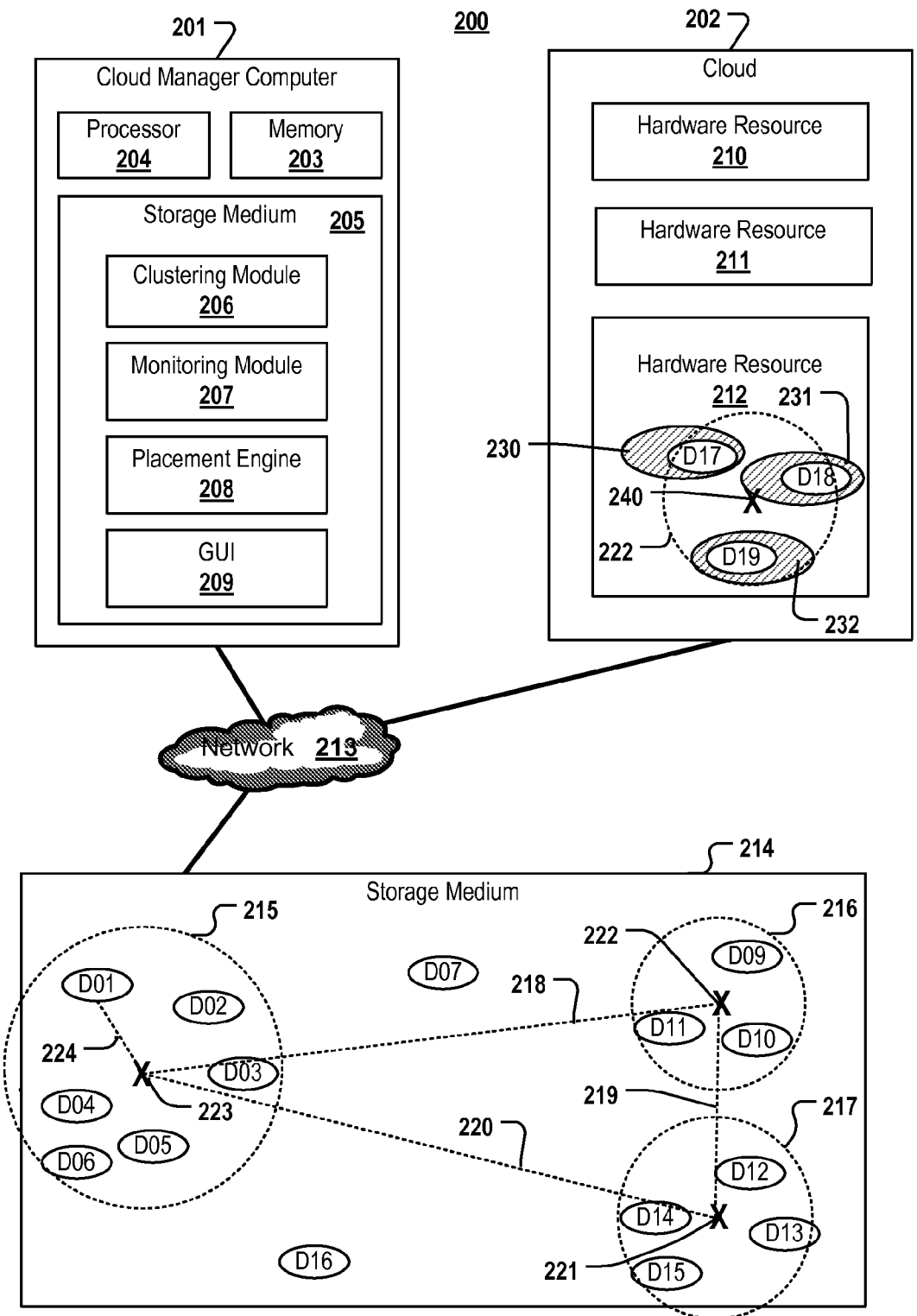
FIG. 2 is a block diagram of a cloud environment comprising multiple hardware resources.
Figure 4:
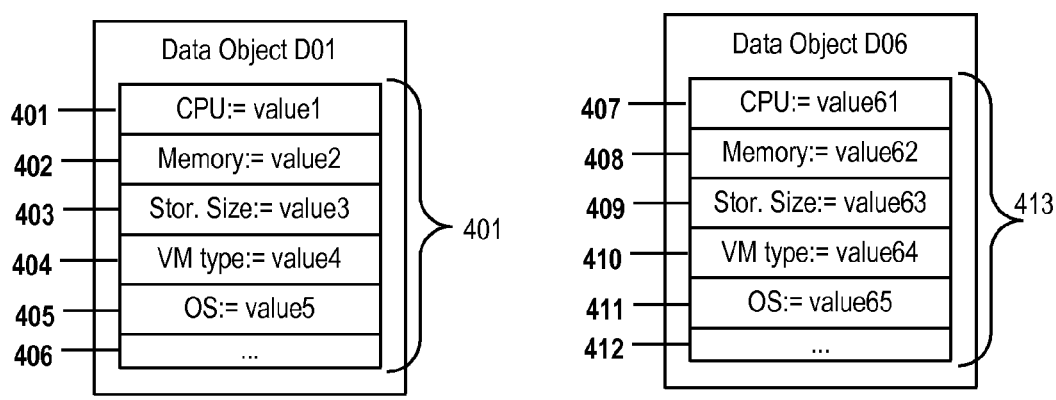
FIG. 4 shows two data objects respectively comprising a vector of property-value pairs.

FIG. 1 is a flowchart of a method according to an embodiment of the description. In the following, the method steps of FIG. 1 will be described by making reference to the data objects stored to the storage medium 214 as depicted in FIGS. 2 and 4. In a first step 101, a plurality of data objects is provided. For example, the data objects may be stored to storage medium 214, typically a storage volume consisting of one or more physical storage devices. A clustering computer, for example a 'cloud manager computer' 201, may have access to a storage medium 214 via a network 213. Alternatively, storage medium 214 may be part of the cloud manager computer 201. The method steps 102-105 are executed by the clustering module 206 of the cloud manager computer 201. The data objects D01-D19 may be provided to the clustering module 206 by the clustering module accessing storage medium 214 or by receiving the data objects via the network 213 by the clustering module 206 from another computer comprising storage medium 214. Each of the data objects D01-D19 comprises a plurality of property-value pairs 401-406 as depicted in FIG. 4. All data objects share the same set of properties but may have different property values respectively for each property. In a second step 102, a clustering algorithm is applied to the data objects for grouping at least some of the data objects into clusters 215-217.

Depending on the applied clustering algorithm, not all of the data objects may necessarily be part of a cluster as is the case, for example, for D07 and D16. The grouping depends on the property-value pairs of each of the data objects and results in the grouping of data objects having similar values for their respective properties into the same group. In step 103, for each of the clusters, a cluster center 221-223 is calculated. Each cluster center consists of or comprises a plurality of derivative property value pairs. Each derivative value of a particular property was derived from all values of said particular property of all data objects of said cluster. In step 104, for at least a first one of the cluster centers, a complementary cluster center is calculated. The complementary cluster center is not (or only by chance) the center of any of the clusters having been calculated in step 102. The complementarity cluster center is a derivative of the first cluster center and is only called 'complementary cluster center' because it typically shares the same data structure with all the cluster centers having been calculated in step 102. For example, said data structure may be a vector whose elements at a given position in the vector respectively represent one of the object properties and which comprise the respective property values. The first cluster for which step 104 is executed may be determined by a user selecting one of the clusters via a graphical user interface as the first cluster.

Alternatively, a data placement engine may automatically determine one or more further data objects D17-D19 representing pieces of data 230-232 having already being deployed to a particular hardware resource 212 for specifying a further cluster 222 from which a further cluster center 240 is calculated in accordance with step 103. Said further cluster may be used as the first cluster and said further cluster center may be used as the first cluster center. In step 105 a second cluster center being the cluster center of a second cluster is determined. The determination comprises determining the one of the cluster centers having the smallest distance in respect to the complementary cluster center. A more detailed description of said step will be given in the description of FIG. 3. Said steps may comprise calculating all distances of all cluster centers in respect to the complementary cluster center 240 (a calculation which is faster than calculating an "all against all" distance comparison for all the cluster centers) or data objects. In step 106 at least one data object of the determined second cluster is selected as a data object being complementary to the data objects of the first cluster. A piece of data represented by the selected data object may later on be transferred together with a piece of data represented by a data object of the first cluster to the same hardware resource. The transfer may be executed automatically by the data placement engine or semi-automatically by prompting a user to permit or trigger the transfer. Still alternatively, the first and second clusters comprising complementary data objects may be displayed to the user, thereby allowing the user to manually execute the transfer of complementarity pieces of data (e.g. VMs) represented by complementary data objects.

FIG. 2 shows a data processing system 200 comprising a clustering computer system 201. The clustering computer system comprises a processor 204 and a memory 203 for executing the program instructions stored in storage medium 205. A clustering module 206 is operable to execute the clustering algorithm for calculating the cluster, the respective cluster centers, the complementary cluster center and the distances between the cluster centers. The system may also comprise a graphical user interface 209 for graphically representing the data objects and the calculated clusters via a GUI on a screen to a user (see also FIG. 3). The cloud manager computer system may further comprise a monitoring module 207 for monitoring a plurality of hardware resources 210-212 used for providing services in a cloud 202. On hardware resource 212 three pieces of data, e.g. virtual machines, 230-232 are already stored or executed. The monitoring module may monitor the resource consumption of each of the pieces of data during one or more time periods and use this information for calculating the average or maximum property values and for updating the data objects D17-D19 representing the stored or executed pieces of data. Each data object D17-D19 comprises a set of property value pairs respectively comprising property values monitored over a parameter-specific, given time period, e.g. a second, a minute or an hour. Each set of properties may be represented as a vector as depicted in FIG. 4.

According to embodiments, the clustering computer 201 further comprises a data placement engine 208 which fulfills the task of using the clustering results provided by the clustering module 206 for determining complementarity data objects representing complementary pieces of data 213-232. The data placement engine 208 automatically or semi-automatically transfers complementarity pieces of data together to one of the hardware resources provided said hardware resource has sufficient capacities. The clustering computer 201 may be connected with the storage medium via a network 213 which is also linked to the cloud, thereby allowing the transfer of complementary pieces of data to one of the resources 210-212 from a storage, e.g. a VM library (not shown) via the network.

According to other embodiments (not shown), the placement engine and/or the monitoring module may not be part of the clustering computer 201 which comprises the clustering module 206 but may rather be part of another computer connected to the clustering computer. The GUI 209 may likewise be part of another computer. Said other computers may respectively be connected to the clustering computer and to each other via a network. In this case, the clustering results provided by the clustering module of the clustering computer can be fed into any existing virtual machine placement engine in a given cloud environment for improving the placement decision of said placement engine and for using available hardware resources more effectively.

Figure 3:
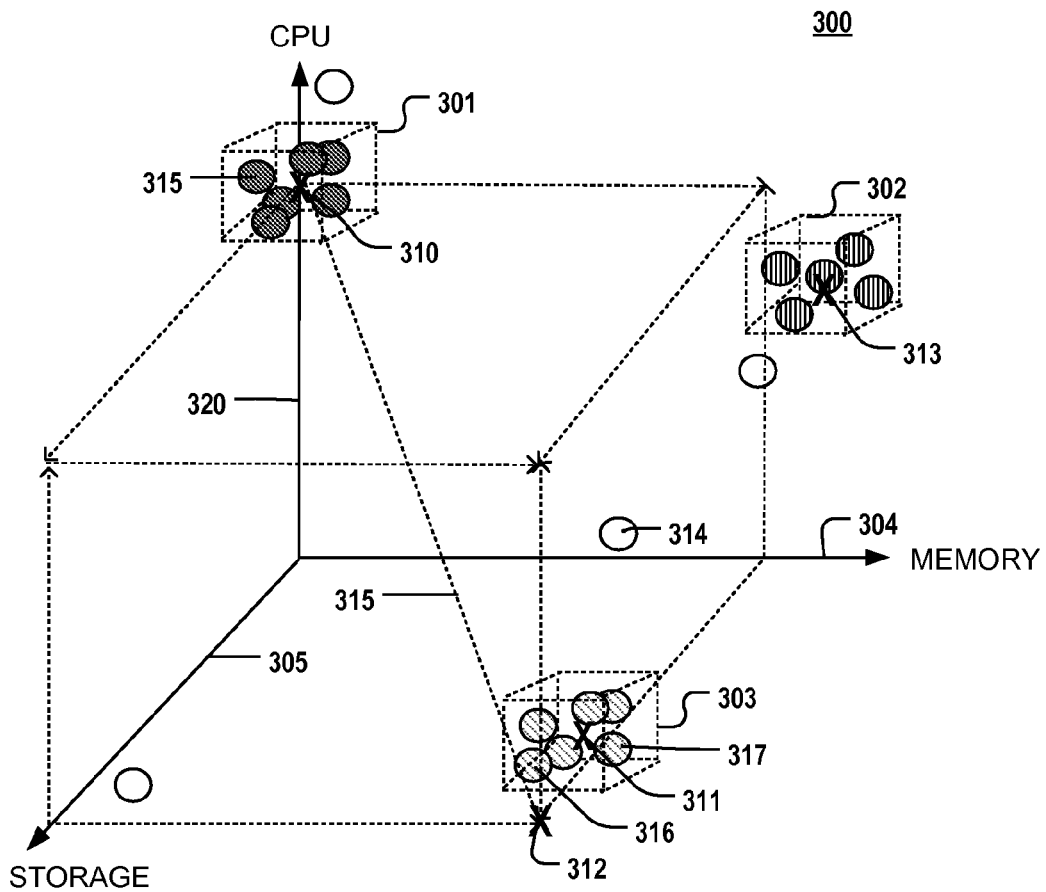
FIG. 3 shows GUI elements representing results of the clustering.

FIG. 3 shows a GUI of an embodiment wherein a number N of property-value pairs represented by an axis of a coordinate system is 3. The GUI comprises a three-dimensional (3D)-coordinate system 300 containing a plurality of GUI elements. Each of the three properties of the property value pairs of the data objects are respectively represented as an axis. Axis 304 represents the average memory usage of any piece of data. Axis 305 represents the average storage usage and axis 320 represents the average CPU usage of any piece of data. Said properties may be selected by a user via a first type of selectable GUI elements such as a drop-down list (not shown). Preferentially, the selected properties represented by the three axes are bottleneck properties. A second type of GUI elements 301-303, in this case dotted cubes, indicate and represent the individual clusters to the user. The third type of GUI elements 314-317 represented herein as circles respectively represent a data object, whereby the GUI elements representing data objects of different clusters have different hatching. The cluster centers 310, 311, 313 are indicated by an "X". The three values of said three selected properties of each of the data objects determine the corresponding axes' coordinate values of each GUI element respectively representing a data object. According to the embodiment depicted in FIG. 3, cluster 301 is selected as the first cluster. A complementary cluster center 312 is calculated by the clustering module 206. The distance between the first cluster center 310 and the complementarity cluster center 312 is indicated by line 315, the complementarity being determined in respect to the data space of the totality of data objects clustered. After having determined the complementarity cluster center 312, the distance between the complementarity cluster center 312 and all other cluster centers 311 and 313 are calculated for determining in step 105 the one of the cluster centers having the smallest distance from the complementary cluster center 312. In the depicted embodiment, cluster center 311 is much nearer to the complementary cluster center 312 than, for example, cluster center 313. Therefore, cluster center 311 is determined as the second cluster center and the corresponding cluster 303 is determined to be the second cluster comprising data objects 316 being complementarity to the data objects 315 of the first cluster 301.

In case the data objects represent pieces of data, the pieces of data represented by data objects 316 and 315 may be transferred to one and the same hardware resource together. The complementarity data objects within the second cluster 303 may be selected for transfer by randomly selecting one or more data objects 316, 317 of the second cluster 303. Alternatively, the GUI elements representing said data objects may be selectable and the selection may be performed by the user via the GUI.

According to the depicted embodiment, the distance between the data object 316 and the complementarity data center 312 is smaller than the distance between the data object 317 and the complementary cluster center 312. Therefore, the piece of data represented by data object 316 might be selected by a user prior to the piece of data represented by data object 317. The selected piece of data is then transferred together with a piece of data represented by a data object 315 of the first cluster 301 to said hardware resource.

FIG. 4 shows two data objects D01 and D06 respectively comprising a vector 401, 413 of property-value pairs. Each position of the respective vectors corresponds to the same property. For example, the first element 401 of data object D01 as well as the first element 407 of data object D06 represent the property 'average CPU consumption' (CPU). However, each vector element may have respectively stored at different value. The same holds true for all the other elements 402-406 and 408-412 of the vectors of the respective data objects D01 and D06. According to preferred embodiments, the data structure of all the cluster centers including the complementarity cluster center is identical to the data structure of the respective data objects.

What is claimed is:

1. A computer-implemented method for identifying complementary data objects, the method comprising:
    providing a plurality of data objects, each of the data objects having a plurality of property-value pairs;
    applying a clustering algorithm for grouping at least some of the data objects into a set of two or more clusters, the grouping depending on the property-value pairs of the data objects;
    for each cluster of the set of clusters, calculating a cluster center, the cluster center comprising a plurality of derivative property-value pairs derived from the property-value pairs of all data objects belonging to said cluster;
    calculating, for at least a first one of the cluster centers, a complementary cluster center, the first cluster center being a cluster center of a first one of the set of clusters, the complementary cluster center not being a cluster center of a cluster of the set of clusters and having a maximum possible degree of complementarity in respect to the first cluster center wherein the maximum possible degree of complementarity is a function of a maximum property value less a property value of a property-value pair of a data object of the first one of the clusters;
    determining a second cluster center of a second cluster, the second cluster center being determined as the one of the cluster centers having the smallest distance in respect to the complementary cluster center;
    selecting at least one data object of the determined second cluster as a data object being complementary to the data objects of the first cluster;
    wherein each of the data objects represents a piece of data and wherein at least some of the property-value pairs of each data object are selected, in any combination, from a group comprising:
    an average CPU utilization;
    a maximum CPU utilization;
    an average disc space utilization;
    a maximum disc space utilization;
    an average memory utilization;
    a maximum memory utilization;
    an average disc I/O utilization;
    a maximum disc I/O utilization;
    an average network I/O utilization; and
    a maximum network disc I/O utilization.

2. The computer-implemented method of claim 1, wherein each of the data objects represents a piece of data, the piece of data being at least one of executed and stored on a hardware resource, wherein one or more properties of the property-value pairs are resource consumption properties, the method further comprising:
    monitoring the values of one or more of the resource consumption properties of the piece of data being at least one of executed and stored on the resource during a period of time;
    for each of the monitored properties and for each of the data objects, calculating at least one of a maximum and an average resource consumption property value over a period of time; and
    assigning the calculated maximum and average resource consumption property values to the data object representing the monitored piece of data for using said assigned property values as input for the clustering algorithm.

3. The computer-implemented method of claim 1, wherein each of the data objects represents a piece of data to be at least one of executed and stored on a hardware resource, further comprising:
    receiving, by a data placement engine, one or more further data objects, each of the further data objects representing a piece of data currently at least one of executed and stored on said hardware resource, each of the further data objects comprising a plurality of property-value pairs wherein one or more of said property-value pairs are indicative of a currently consumed capacity of said hardware resource;
    using the received one or more further data objects for grouping said further data objects into one further cluster and for calculating a further cluster center, said further cluster center being the cluster center of said further cluster;
    using the further cluster center as the first cluster center for calculating the complementary cluster center and for determining the second cluster; and
    at least one of automatically transferring one or more pieces of data represented by data objects of said second cluster to said hardware resource and prompting a user to initiate said transfer.

4. The computer-implemented method of claim 1, further comprising:
    receiving, by a data placement engine, an indication of at least the first and second cluster;

at least one of automatically transferring pieces of data represented by data objects of the first and the second cluster to a hardware resource and prompting a user to initiate said transfer.

5. The computer-implemented method of claim 1, wherein the clustering algorithm is selected from a group comprising:
a k-Means clustering algorithm;
a k-Medoids clustering algorithm;
a demographic clustering algorithm;
a self-organizing maps clustering approach;
a classification algorithm grouping the data objects into a predefined number of classes acting as clusters; and
an overlapping clustering algorithm.

6. The computer-implemented method of claim 1, wherein the calculation of the cluster centers comprises:
for each of the data objects, representing all property-value pairs of said data object as an object vector, each element of said object vector corresponding to one of the properties of a property-value pair and having stored said property's value;
providing a center vector for each of the clusters, the center vector specifying the cluster center of said cluster, wherein the elements at a given position in the center vectors and elements in the object vectors having the same position represent the same one of the properties;
for each of the clusters, calculating its respective cluster center by storing, into each element of the cluster's center vector, an arithmetic mean value, the arithmetic mean value being calculated from the values stored in the corresponding elements of the object vectors of said cluster.

7. The computer implemented method according to claim 6, further comprising:
at least one of randomly selecting one or more data objects of the determined second cluster and prompting a user to execute said selection;
at least one of automatically transferring the one or more pieces of data represented by said selected data objects of said second cluster and prompting a user to initiate said transfer.

8. The computer-implemented method of claim 6, further comprising:
normalizing all values stored in elements of the object vectors before calculating the arithmetic mean values, the normalized values being larger than or equal to 0 and being smaller than or equal to a predefined maximum value MaxV;
wherein the cluster centers of all clusters are calculated by using the normalized property-value pairs of the respective data objects of each respective cluster as input;
wherein the calculation of the complementary cluster center in respect to the first cluster comprises:
calculating, for each element e of the center vector of the first cluster having stored a property value $PV_e$, a complementary value $CV_e$, wherein $CV_e = MaxV - PV_e$;
storing each complementary value $CV_e$ to an element of a complementary center vector acting as the complementary cluster center;
for each of the clusters, calculating an Euclidian distance between the center vector of said cluster and the complementary center vector;
using said Euclidian distances for determining the second cluster center as the one of the cluster centers having the smallest Euclidian distance in respect to the complementary cluster center.

9. The computer-implemented method of claim 1, further comprising:
displaying one or more selectable first GUI elements on a GUI for allowing a user to select N of the properties, N being an integer larger than 1;
displaying second and third GUI elements in an N-dimensional coordinate system on the GUI, each of the second GUI elements representing a cluster, each of the third GUI elements representing a data object, wherein the third GUI elements representing data objects of different clusters differ from each other, wherein each of the axes of the N-dimensional coordinate system represents one of the N selected properties, the N values of said N selected properties of each of the data objects determining the corresponding axes' coordinate values of the third GUI element representing said data object.

10. The computer-implemented method of claim 1, further comprising:
determining a sub-set of properties from the totality of property-value pairs of each data object, the sub-set of properties being determined by at least one of receiving a selection signal from a user and automatically determining, by a data placement engine, bottleneck parameters of a hardware resource;
executing the steps of applying the clustering algorithm and calculating the cluster centers and the complementary cluster center selectively for property-value pairs of the determined sub-set of properties.

11. A computer-readable storage medium comprising instructions which, when executed by a processor, execute operations, the operations comprising:
providing a plurality of data objects, each of the data objects having a plurality of property-value pairs;
applying a clustering algorithm for grouping at least some of the data objects into a set of two or more clusters, the grouping depending on the property-value pairs of the data objects;
for each cluster of the set of clusters, calculating a cluster center, the cluster center comprising a plurality of derivative property-value pairs derived from the property-value pairs of all data objects belonging to said cluster;
calculating, for at least a first one of the cluster centers, a complementary cluster center, the first cluster center being a cluster center of a first one of the set of clusters, the complementary cluster center not being a cluster center of a cluster of the set of clusters and having a maximum possible degree of complementarity in respect to the first cluster center wherein the maximum possible degree of complementarity is a function of a maximum property value less a property value of a property-value pair of a data object of the first one of the clusters;
determining a second cluster center of a second cluster, the second cluster center being determined as the one of the cluster centers having the smallest distance in respect to the complementary cluster center;
selecting at least one data object of the determined second cluster as a data object being complementary to the data objects of the first cluster;
wherein each of the data objects represents a piece of data and wherein at least some of the property-value pairs of each data object are selected, in any combination, from a group comprising:

an average CPU utilization;
a maximum CPU utilization;
an average disc space utilization;
a maximum disc space utilization;
an average memory utilization;
a maximum memory utilization;
an average disc I/O utilization;
a maximum disc I/O utilization;
an average network I/O utilization; and
a maximum network disc I/O utilization.

12. The computer-readable storage medium of claim 11, wherein each of the data objects represents a piece of data, the piece of data being at least one of executed and stored on a hardware resource, wherein one or more properties of the property-value pairs are resource consumption properties, the method further comprising:
    monitoring the values of one or more of the resource consumption properties of the piece of data being at least one of executed and stored on the resource during a period of time;
    for each of the monitored properties and for each of the data objects, calculating at least one of a maximum and an average resource consumption property value over a period of time; and
    assigning the calculated maximum and average resource consumption property values to the data object representing the monitored piece of data for using said assigned property values as input for the clustering algorithm.

13. The computer-readable storage medium of claim 11, wherein each of the data objects represents a piece of data to be at least one of executed and stored on a hardware resource, further comprising:
    receiving, by a data placement engine, one or more further data objects, each of the further data objects representing a piece of data currently at least one of executed and stored on said hardware resource, each of the further data objects comprising a plurality of property-value pairs wherein one or more of said property-value pairs are indicative of a currently consumed capacity of said hardware resource;
    using the received one or more further data objects for grouping said further data objects into one further cluster and for calculating a further cluster center), said further cluster center being the cluster center of said further cluster;
    using the further cluster center as the first cluster center for calculating the complementary cluster center and for determining the second cluster; and
    at least one of automatically transferring one or more pieces of data represented by data objects of said second cluster to said hardware resource and prompting a user to initiate said transfer.

14. The computer-readable storage medium of claim 11, further comprising:
    receiving, by a data placement engine, an indication of at least the first and second cluster; and
    at least one of automatically transferring pieces of data represented by data objects of the first and the second cluster to a hardware resource and prompting a user to initiate said transfer;
    wherein the clustering algorithm is selected from a group comprising:
    a k-Means clustering algorithm;
    a k-Medoids clustering algorithm;
    a demographic clustering algorithm;
    a self-organizing maps clustering approach;
    a classification algorithm grouping the data objects into a predefined number of classes acting as clusters; and
    an overlapping clustering algorithm.

15. The computer-readable storage medium of claim 11, wherein the calculation of the cluster centers comprises:
    for each of the data objects, representing all property-value pairs of said data object as an object vector, each element of said object vector corresponding to one of the properties of a property-value pair and having stored said property's value;
    providing a center vector for each of the clusters, the center vector specifying the cluster center of said cluster, wherein the elements at a given position in the center vectors and elements in the object vectors having the same position represent the same one of the properties;
    for each of the clusters, calculating its respective cluster center by storing, into each element of the cluster's center vector, an arithmetic mean value, the arithmetic mean value being calculated from the values stored in the corresponding elements of the object vectors of said cluster;
    at least one of randomly selecting one or more data objects of the determined second cluster and prompting a user to execute said selection;
    at least one of automatically transferring the one or more pieces of data represented by said selected data objects of said second cluster and prompting a user to initiate said transfer;
    normalizing all values stored in elements of the object vectors before calculating the arithmetic mean values, the normalized values being larger than or equal to 0 and being smaller than or equal to a predefined maximum value MaxV;
    wherein the cluster centers of all clusters are calculated by using the normalized property-value pairs of the respective data objects of each respective cluster as input;
    wherein the calculation of the complementary cluster center in respect to the first cluster comprises:
    calculating, for each element e of the center vector of the first cluster having stored a property value $PV_e$, a complementary value $CV_e$, wherein $CV_e = MaxV - PV_e$;
    storing each complementary value $CV_e$ to an element of a complementary center vector acting as the complementary cluster center;
    for each of the clusters, calculating an Euclidian distance between the center vector of said cluster and the complementary center vector; and
    using said Euclidian distances for determining the second cluster center as the one of the cluster centers having the smallest Euclidian distance in respect to the complementary cluster center.

16. The computer-readable storage medium of claim 11, further comprising:
    displaying one or more selectable first GUI elements on a GUI for allowing a user to select N of the properties, N being an integer larger than 1;
    displaying second and third GUI elements in an N-dimensional coordinate system on the GUI, each of the second GUI elements representing a cluster, each of the third GUI elements representing a data object, wherein the third GUI elements representing data objects of different clusters differ from each other, wherein each of the axes of the N-dimensional coordinate system represents one of the N selected properties, the N values of said N selected properties of each of the data objects determining the corresponding axes' coordinate values of the third GUI element representing said data object;

determining a sub-set of properties from the totality of property-value pairs of each data object, the sub-set of properties being determined by at least one of receiving a selection signal from a user and automatically determining, by a data placement engine, bottleneck parameters of a hardware resource; and executing the steps of applying the clustering algorithm and calculating the cluster centers and the complementary cluster center selectively for property-value pairs of the determined sub-set of properties.

17. A data processing system, the data processing system comprising a clustering computer system, the clustering computer system comprising:

a storage medium having at least one of stored a plurality of data objects and an interface for receiving the data objects via a network, each of the data objects having a plurality of property-value pairs;

a processor being adapted for:

applying a clustering algorithm for grouping at least some of the data objects into a set of two or more clusters, the grouping depending on the property-value pairs of the data objects;

for each cluster of the set of clusters, calculating a cluster center, the cluster center comprising a plurality of derivative property-value pairs derived from the property-value pairs of all data objects belonging to said cluster;

calculating, for at least a first one of the cluster centers, a complementary cluster center, the first cluster center being a cluster center of a first one of the set of clusters, the complementary cluster center not being a cluster center of a cluster of the set of clusters and having a maximum possible degree of complementarity in respect to the first cluster center wherein the maximum possible degree of complementarity is a function of a maximum property value less a property value of a property-value pair of a data object of the first one of the clusters;

determining a second cluster center of a second cluster, the second cluster center being determined as the one of the cluster centers having the smallest distance in respect to the complementary cluster center;

selecting at least one data object of the determined second cluster as a data object being complementary to the data objects of the first cluster;

wherein each of the data objects represents a piece of data and wherein at least some of the property-value pairs of each data object are selected, in any combination, from a group comprising:

an average CPU utilization;
a maximum CPU utilization;
an average disc space utilization;
a maximum disc space utilization;
an average memory utilization;
a maximum memory utilization;
an average disc I/O utilization;
a maximum disc I/O utilization;
an average network I/O utilization; and
a maximum network disc I/O utilization.

18. The data processing system of claim 17 further comprising a monitoring module and having a plurality of hardware resources, wherein each of the data objects represents a piece of data, the piece of data being at least one of executed and stored on a hardware resource, wherein one or more of the properties are resource consumption properties, wherein the clustering computer system is operatively coupled to a monitoring module, wherein the monitoring module is adapted for monitoring one or more of the values of the resource consumption properties of the piece of data being executed or stored on the resource during a period of time;

wherein the clustering computer system is adapted for:

for each of the monitored properties and for each of the data objects, calculating at least one of a maximum and an average resource consumption property value over a period of time; and assigning the calculated at least one of the maximum and average resource consumption property values to the data object representing the monitored piece of data for using said assigned property values as input for the clustering algorithm.

19. The data processing system of claim 17 further comprising a plurality of hardware resources and a data placement engine, wherein the data placement engine is adapted for:

receiving one or more further data objects, each of the further data objects representing a piece of data currently at least one of executed and stored on a hardware resource, each of the further data objects comprising a plurality of property-value pairs wherein one or more of said property-value pairs are at least one of indicative of a currently consumed capacity of said hardware resource and indicative of a predefined resource consumption;

using the received one or more further data objects for grouping said further data objects into one further cluster and for calculating a further cluster center, said further cluster center being the cluster center of said further cluster;

using the further cluster center as the first cluster center for calculating the complementary cluster center and for determining the second cluster; and at least one of automatically transferring one or more pieces of data represented by data objects of said second cluster to said hardware resource, and prompting a user to initiate said transfer.

20. The data processing system of claim 17, further comprising a plurality of hardware resources and a data placement engine, wherein the data placement engine is adapted for:

receiving, by the data placement engine, an indication of at least the first and second cluster; and at least one of automatically transferring pieces of data represented by data objects of the first and the second cluster to a hardware resource and prompting a user to initiate said transfer;

wherein the clustering algorithm is selected from a group comprising:

a k-Means clustering algorithm;
a k-Medoids clustering algorithm;
a demographic clustering algorithm;
a self-organizing maps clustering approach;
a classification algorithm grouping the data objects into a predefined number of classes acting as clusters; and
an overlapping clustering algorithm.

21. The data processing system of claim 17, wherein the calculation of the cluster centers comprises:

for each of the data objects, representing all property-value pairs of said data object as an object vector, each element of said object vector corresponding to one of the properties of a property-value pair and having stored said property's value;

providing a center vector for each of the clusters, the center vector specifying the cluster center of said cluster, wherein the elements at a given position in the center vectors and elements in the object vectors having the same position represent the same one of the properties;

for each of the clusters, calculating its respective cluster center by storing, into each element of the cluster's center vector, an arithmetic mean value, the arithmetic mean value being calculated from the values stored in the corresponding elements of the object vectors of said cluster;

at least one of randomly selecting one or more data objects of the determined second cluster and prompting a user to execute said selection;

at least one of automatically transferring the one or more pieces of data represented by said selected data objects of said second cluster and prompting a user to initiate said transfer;

normalizing all values stored in elements of the object vectors before calculating the arithmetic mean values, the normalized values being larger than or equal to 0 and being smaller than or equal to a predefined maximum value MaxV;

wherein the cluster centers of all clusters are calculated by using the normalized property-value pairs of the respective data objects of each respective cluster as input;

wherein the calculation of the complementary cluster center in respect to the first cluster comprises:

calculating, for each element e of the center vector of the first cluster having stored a property value $PV_e$, a complementary value $CV_e$, wherein $CV_e = MaxV - PV_e$;

storing each complementary value $CV_e$ to an element of a complementary center vector acting as the complementary cluster center;

for each of the clusters, calculating an Euclidian distance between the center vector of said cluster and the complementary center vector; and using said Euclidian distances for determining the second cluster center as the one of the cluster centers having the smallest Euclidian distance in respect to the complementary cluster center.

22. The data processing system of claim 17, further comprising a display wherein the a processor is further adapted for:

displaying a graphical user interface (GUI) having one or more selectable first GUI elements for allowing a user to select N of the properties, N being an integer larger than 1;

displaying second and third GUI elements in an N-dimensional coordinate system on the GUI, each of the second GUI elements representing a cluster, each of the third GUI elements representing a data object, wherein the third GUI elements representing data objects of different clusters differ from each other, wherein each of the axes of the N-dimensional coordinate system represents one of the N selected properties, the N values of said N selected properties of each of the data objects determining the corresponding axes' coordinate values of the third GUI element representing said data object;

determining a sub-set of properties from the totality of property-value pairs of each data object, the sub-set of properties being determined by at least one of receiving a selection signal from a user and automatically determining, by a data placement engine, bottleneck parameters of a hardware resource; and executing the steps of applying the clustering algorithm and calculating the cluster centers and the complementary cluster center selectively for property-value pairs of the determined sub-set of properties.

* * * * *